US010225242B2

(12) United States Patent
Grim et al.

(10) Patent No.: US 10,225,242 B2
(45) Date of Patent: *Mar. 5, 2019

(54) AUTOMATED AUTHORIZATION RESPONSE TECHNIQUES

(71) Applicant: salesforce.com, inc., San Francisco, CA (US)

(72) Inventors: Evan Tyler Grim, Austin, TX (US); Josh Alexander, Austin, TX (US)

(73) Assignee: salesforce.com, inc., San Francisco, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/849,312

(22) Filed: Sep. 9, 2015

(65) Prior Publication Data
US 2015/0381602 A1 Dec. 31, 2015

Related U.S. Application Data

(63) Continuation-in-part of application No. 14/071,637, filed on Nov. 4, 2013, now Pat. No. 9,210,150, which
(Continued)

(51) Int. Cl.
*H04L 29/06* (2006.01)
*H04W 12/06* (2009.01)

(52) U.S. Cl.
CPC ............. *H04L 63/08* (2013.01); *H04W 12/06* (2013.01); *H04L 63/0861* (2013.01); *H04L 63/107* (2013.01); *H04L 2463/082* (2013.01)

(58) Field of Classification Search
CPC ... H04L 63/08; H04L 63/0861; H04L 63/107; H04L 2463/082; H04W 12/06; H04W 4/008
See application file for complete search history.

(56) References Cited

U.S. PATENT DOCUMENTS

| 5,963,646 | A | 10/1999 | Fielder et al. |
| 5,995,624 | A | 11/1999 | Fielder et al. |

(Continued)

FOREIGN PATENT DOCUMENTS

| EP | 1816821 | 8/2007 |
| JP | 2007-042103 | 2/2007 |

(Continued)

OTHER PUBLICATIONS

"Google 2-step Verification" Article published Dec. 20, 2013 as verified by Internet Archive (4 pages) http://web.archive.org/web/20131220004531/http://www.google.com/landing/2step/.*
(Continued)

*Primary Examiner* — Joseph P Hirl
*Assistant Examiner* — Thomas A Gyorfi
(74) *Attorney, Agent, or Firm* — Meyertons, Hood, Kivlin, Kowert & Goetzel, P.C.

(57) ABSTRACT

Techniques are disclosed relating to automating permission requests, e.g., in the context of multi-factor authentication. In some embodiments a mobile device receives permission requests that specify sets of one or more automation criteria. In some embodiments, the mobile device prompts a user for a response to permission requests when the criteria are not met and automatically responds to permission requests (e.g., without requiring user input) when the criteria are met. Disclosed techniques may increase authorization security while reducing user interaction for multi-factor authentication, in some embodiments.

19 Claims, 8 Drawing Sheets

Related U.S. Application Data is a continuation-in-part of application No. 13/660,976, filed on Oct. 25, 2012, now Pat. No. 8,578,454.

(60) Provisional application No. 62/047,715, filed on Sep. 9, 2014, provisional application No. 61/878,537, filed on Sep. 16, 2013, provisional application No. 61/693,690, filed on Aug. 27, 2012, provisional application No. 61/609,824, filed on Mar. 12, 2012, provisional application No. 61/551,370, filed on Oct. 25, 2011.

(56) References Cited

U.S. PATENT DOCUMENTS

| | | | |
|---|---|---|---|
| 6,049,612 | A | 4/2000 | Fielder et al. |
| 6,105,133 | A | 8/2000 | Fielder et al. |
| 7,104,444 | B2 | 9/2006 | Suzuki |
| 7,548,886 | B2 | 6/2009 | Kirkland et al. |
| 7,669,760 | B1 | 3/2010 | Zettner |
| 7,801,304 | B1 | 9/2010 | Harvey et al. |
| 7,805,749 | B1 | 9/2010 | Harvey et al. |
| 7,860,131 | B1 | 12/2010 | Harvey et al. |
| 7,908,638 | B1 | 3/2011 | Harvey et al. |
| 8,627,438 | B1* | 1/2014 | Bhimanaik .............. H04L 63/10 726/9 |
| 8,806,567 | B1* | 8/2014 | Venable, Sr. ....... H04L 63/0823 340/8.1 |
| 8,955,063 | B2* | 2/2015 | Shibuya ................. G06F 21/31 713/186 |
| 2003/0182194 | A1 | 9/2003 | Choey et al. |
| 2006/0136334 | A1 | 6/2006 | Atkinson et al. |
| 2006/0282500 | A1* | 12/2006 | Kiuchi ................... H04L 67/12 709/203 |
| 2007/0055878 | A1 | 3/2007 | Sandhu et al. |
| 2007/0174082 | A1 | 7/2007 | Singh |
| 2010/0006642 | A1 | 1/2010 | Boutcher et al. |
| 2010/0100454 | A1 | 4/2010 | Sines et al. |
| 2010/0174649 | A1 | 7/2010 | Bouchard |
| 2010/0217880 | A1 | 8/2010 | Venezia et al. |
| 2010/0293598 | A1 | 11/2010 | Collart et al. |
| 2010/0299529 | A1 | 11/2010 | Fielder |
| 2011/0007901 | A1* | 1/2011 | Ikeda ...................... H04B 5/02 380/270 |
| 2011/0047597 | A1* | 2/2011 | Mahaffey .............. G06F 21/564 726/3 |
| 2011/0142234 | A1 | 6/2011 | Rogers |
| 2011/0202466 | A1 | 8/2011 | Carter |
| 2011/0219230 | A1* | 9/2011 | Oberheide ................ H04L 9/32 713/168 |
| 2011/0307699 | A1 | 12/2011 | Fielder |
| 2011/0307705 | A1 | 12/2011 | Fielder |
| 2011/0307706 | A1 | 12/2011 | Fielder |
| 2011/0307707 | A1 | 12/2011 | Fielder |
| 2011/0312278 | A1* | 12/2011 | Matsushita ....... H04L 12/40013 455/66.1 |
| 2011/0314281 | A1 | 12/2011 | Fielder |
| 2012/0066745 | A1* | 3/2012 | Wuthnow ........... G06F 21/6245 726/4 |
| 2012/0068812 | A1* | 3/2012 | Yamamoto ............... G06K 7/00 340/5.1 |
| 2012/0096277 | A1* | 4/2012 | Perez Soria ....... G06Q 20/3274 713/179 |
| 2012/0110329 | A1* | 5/2012 | Brown .................... G06F 21/31 713/168 |
| 2012/0144468 | A1 | 6/2012 | Pratt et al. |
| 2012/0158821 | A1 | 6/2012 | Barros |
| 2012/0159591 | A1* | 6/2012 | Payne ..................... G06F 21/35 726/7 |
| 2012/0280784 | A1 | 11/2012 | Gaviria Velez et al. |
| 2013/0191884 | A1* | 7/2013 | Leicher ................... H04L 63/08 726/4 |
| 2014/0189808 | A1* | 7/2014 | Mahaffey .............. H04L 63/083 726/4 |
| 2014/0378063 | A1* | 12/2014 | Nathwani ............. H04W 4/008 455/41.3 |

FOREIGN PATENT DOCUMENTS

| | | |
|---|---|---|
| JP | 2009-151790 | 7/2009 |
| KR | 10-2002-0038681 | 5/2002 |
| KR | 10-0814561 | 3/2008 |
| WO | 2009/140333 | 11/2009 |
| WO | 2010/043722 | 4/2010 |

OTHER PUBLICATIONS

Office Action in European Application No. 12843520.3 dated Jun. 29, 2016, 6 pages.
Tanaka Toshiaki, et al., "Examining Agent Authentication and Authorization Scheme Regarding ITS." No. 61 (late 2000), National Conference Papers (3), Japan, Information Processing Society of Japan, Oct. 3, 2000, 3F-7, pp. 3-243-3-244.
Office Action in Japanese Application No. 2014-539022 dated Feb. 25, 2016, 20 pages.
Office Action in European Application No. 12843520.3 dated Dec. 2, 2015, 4 pages.
Notice of Allowance in U.S. Appl. No. 13/660,976 dated Jul. 5, 2013, 14 pages.
Office Action in U.S. Appl. No. 14/071,637 dated Mar. 2, 2015, 8 pages.
Notice of Allowance in U.S. Appl. No. 14/071,637 dated Jul. 27, 2015.
International Search Report and Written Opinion of International Application No. PCT/US2012/061999 dated Feb. 13, 2013, 10 pages.
International Preliminary Report of International Application No. PCT/US2012/061999 dated Apr. 29, 2014, 5 pages.
Extended European Search Report in Application No. 12843520.3 dated Jan. 23, 2015, 6 pages.
Office Action in European Application No. 12843520.3 dated Feb. 9, 2017, 3 pages.

* cited by examiner

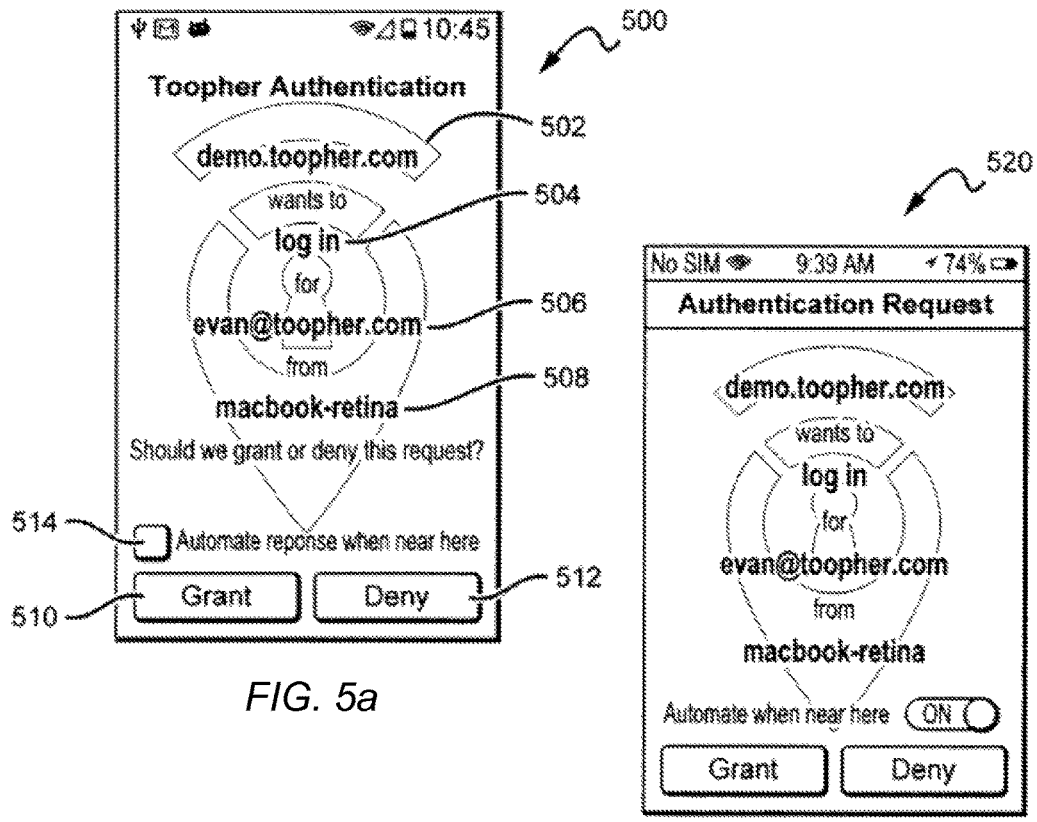
FIG. 5a
FIG. 5b
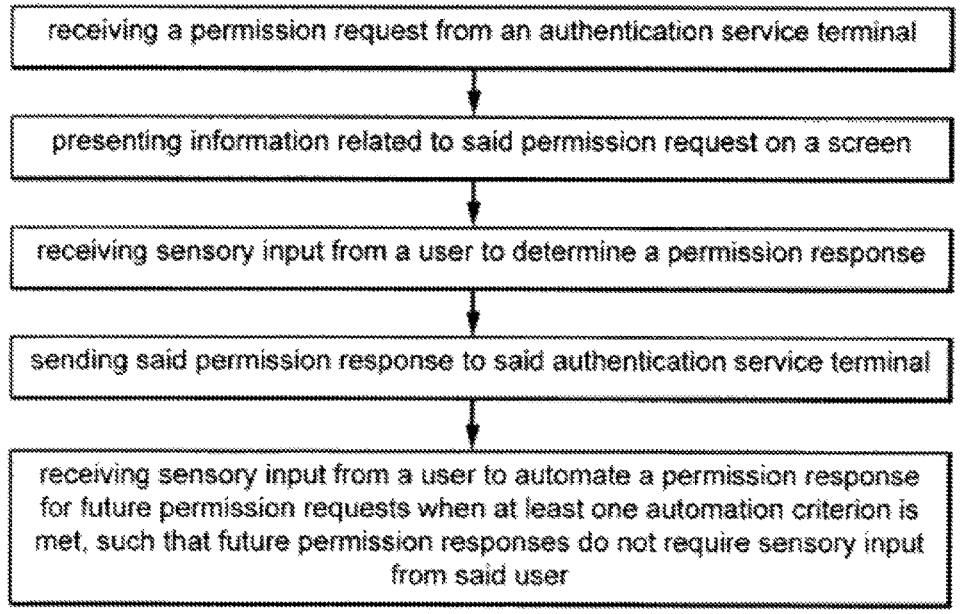
FIG. 6

800

┌─────────────────────────────────────────────────────────────────┐
│ Receive a first permission request from an authorization system, where the first │
│ permission request is a request to perform an action, and where the first │
│ permission request specifies a first set of one or more automation criteria │
│ 810 │
└─────────────────────────────────────────────────────────────────┘
                                    ↓
┌─────────────────────────────────────────────────────────────────┐
│ Automatically respond to the first permission request in response to determining that │
│ the first set of one or more automation criteria are satisfied for the first permission │
│ request │
│ 820 │
└─────────────────────────────────────────────────────────────────┘

┌─────────────────────────────────────────────────────────────────┐
│ Receive information indicating a request by a user to perform an action │
│ 855 │
└─────────────────────────────────────────────────────────────────┘
                                    ↓
┌─────────────────────────────────────────────────────────────────┐
│ Determine a set of one or more automation criteria under which a mobile device │
│ associated with the user should respond to a permission request to perform the action │
│ 860 │
└─────────────────────────────────────────────────────────────────┘
                                    ↓
┌─────────────────────────────────────────────────────────────────┐
│ Transmit a first permission request to the mobile device associated with the user, │
│ where the first permission request specifies the set of one or more automation criteria │
│ 865 │
└─────────────────────────────────────────────────────────────────┘
                                    ↓
┌─────────────────────────────────────────────────────────────────┐
│ Receive a response to the first permission request, where the response is │
│ automatically generated by the mobile device based on the set of one or more │
│ automation criteria without prompting the user for input to accept or deny the first │
│ permission request │
│ 870 │
└─────────────────────────────────────────────────────────────────┘

*FIG. 8B*

AUTOMATED AUTHORIZATION RESPONSE TECHNIQUES

This application is a continuation-in-part of U.S. application Ser. No. 14/071,637, filed Nov. 4, 2013, which is a continuation-in-part of U.S. application Ser. No. 13/660,976, filed Oct. 25, 2012 (now U.S. Pat. No. 8,578,454), which claims the benefit of U.S. Provisional Appl. No. 61/693,690, filed Aug. 27, 2012, U.S. Provisional Appl. No. 61/609,824, filed Mar. 12, 2012, and U.S. Provisional Appl. No. 61/551,370, filed Oct. 25, 2011. The '637 Application also claims the benefit of U.S. Provisional Appl. No. 61/878,537, filed Sep. 16, 2013. This application also claims the benefit of U.S. Provisional Appl. No. 62/047,715, filed Sep. 9, 2014. The disclosures of each of the above-referenced applications are incorporated by reference herein in their entireties. To the extent that any statement in the above-referenced applications is inconsistent the disclosure in the present application, language in the present application controls.

BACKGROUND

Technical Field

Disclosed embodiments relate to systems and methods of authentication and/or authorization, and more specifically, to such systems and methods using geo-location tools in mobile devices.

Description of the Related Art

The security community has long sought a viable second factor to supplement and fortify passwords as a means for user authentication. Previous attempts have been hamstrung by solutions that are too expensive and cumbersome to enjoy mainstream adoption.

Much to the chagrin of the security community, passwords have stubbornly remained the only authentication mechanism in place for the vast majority of user accounts. This is likely due to the simplicity and ease of use that passwords provide account holders. When used as the sole factor for authentication, however, passwords present a litany of issues: they are often either hard to remember or easy to guess, users tend to reuse their passwords with many accounts, they are often stored insecurely both at the client and the server, etc. The consensus has long been that there is a compelling need for an additional mechanisms to supplement and fortify this irksome first factor. A multitude of solutions have been proposed over the years, all promising to provide this much needed additional factor—but for various reasons none have found widespread adoption beyond a relatively small niche user-base. The larger world of mainstream users remains unprotected and would greatly benefit from a solution that does not extensively affect existing authentication routines.

Recently, some multi-factor authentication (MFA) mechanisms have been used; however, none of these known solutions are ideal. Many MFA mechanisms in current use center around the use of a security token. In this scheme, users are issued a token, often a small hardware device with a screen which displays a seemingly random number that changes periodically. Users that have paired a token with a network resource must supply the number currently on the screen at any given moment as part of the login procedure (in addition to a static password, the first authentication factor). If the provided code matches an expected value at a token-aware backend for a given instance, then the system grants the authentication request—feeling confident that a request that can provide a password (something known) and a valid code from the token screen (something possessed) is reasonably likely to be an authentic request. Security schemes using hardware tokens have been relatively successful as a multi-factor authentication mechanism; however these schemes have been limited almost exclusively to environments where use is mandated (e.g., required for login to a corporate VPN, etc.). The lack of widespread adoption outside these mandatory use environments may be attributable to two primary barriers to entry: the significant infrastructure required to implement such systems (e.g., complicated backend servers, hardware costs, etc.) and the inconvenience to a user in having to retrieve a token and transcribe a code every time a login is required.

More recent solutions have mitigated some of the daunting infrastructure requirements, such as the MFA mechanisms deployed by companies such as Facebook and Google. These kind of mechanisms provide software-based tokens that reside on the mobile devices that many of their users already carry on their person. However, these systems still require the user to retrieve his/her mobile device, launch the required application, and transcribe the code currently displayed on the mobile device screen. Many users find this solution to be cumbersome and irritating.

Some other recent solutions use location awareness of a mobile device as a part of a larger authentication process; however, these approaches require the transmission of a user's location or other identifying information to a central server. This raises privacy concerns for users where large amounts of personal data (e.g., daily travel habits) are stored on a third party server where the data may not be secure.

Other location-based approaches require a priori or on-demand location awareness for terminal devices attempting the authentication.

Thus, there is a need for a system that achieves multi-factor authentication without significantly burdening the user while, at the same, time eliminating the need for complicated infrastructure implementations.

BRIEF DESCRIPTION OF THE DRAWINGS

FIGS. 5A-5B show screen shots from a mobile authenticating device, according to some embodiments.

FIG. 6 shows a flow chart of operations that may be performed by a mobile device for authenticating a permission request, according to some embodiments.

FIG. 8A is a flow diagram illustrating a method for receiving automation criteria in permission requests, according to some embodiments.

FIG. 8B is a flow diagram illustrating a method for including automation criteria in permission requests, according to some embodiments.

Figure 1:
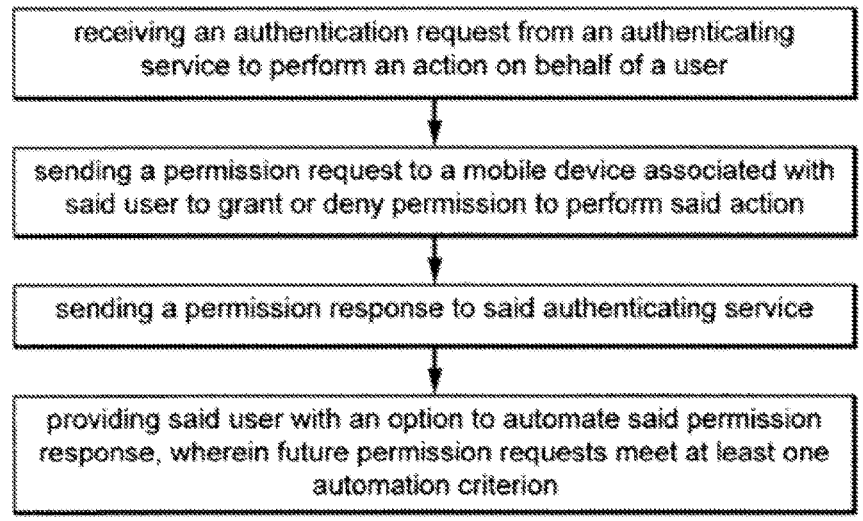
FIG. 1 is flow chart of a method of authentication, according to some embodiments.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Embodiments discussed herein provide systems and methods that provide authentication and/or authorization of defined user actions. In some cases, this is done by leveraging the network connectivity and location awareness of modern mobile devices (such as smartphones, tablet computers, etc.) to provide an automated and unobtrusive authentication factor, which is typically a second factor of authentication to be used in conjunction with a first factor, for example a username/password login combination. In various embodiments, contextual information discussed in the context of automated authentication may also be used as a non-automated authentication and/or authorization factor.

Embodiments of this disclosure may be implemented in numerous ways, including as a method, a process, an apparatus, a system, a composition of matter, a computer readable medium such as a computer readable storage medium or a computer network wherein program instructions are sent over optical or communication links. A component such as a processor or a memory described as being configured to perform a task includes both general components that are temporarily configured to perform the task at a given time and/or specific components that are manufactured to perform the task. In general, the order of the steps of disclosed methods or processes may be altered.

A detailed description of certain embodiments is provided below along with accompanying figures that illustrate the principles of operation. Embodiments are described with particularity, but the invention is not limited to any embodiment. Numerous specific details are set forth in the following description in order to provide a thorough understanding. These details are provided for the purpose of example and the invention may be practiced according to the claims without some or all of these specific details. For the purpose of clarity, technical material that is known in related technical fields has not been described in detail so that the disclosed embodiments are not unnecessarily obscured.

Various aspects will now be described in connection with exemplary embodiments, including certain aspects described in terms of sequences of actions that may be performed by elements of a computer system. For example, it will be recognized that in each of the embodiments, the various actions may be performed by specialized circuits, circuitry (e.g., discrete and/or integrated logic gates interconnected to perform a specialized function), program instructions executed by one or more processors, programmable circuitry (e.g., field-programmable gate arrays) or by any combination of such elements. Thus, the various aspects may be embodied in many different forms, and all such forms are contemplated to be within the scope of what is described. The instructions of a computer program for authorizing a user action may be embodied in any computer-readable medium for use by or in connection with an instruction execution system, apparatus, or device, such as a computer based system, processor containing system, or other system that may fetch the instructions from a computer-readable medium, apparatus, or device and execute the instructions.

FIG. 1 is flow chart of a method of authentication according to some embodiments. An authentication service receives an authentication request from an authenticating service to perform an action on behalf of a user. The authentication service then sends a permission request to a mobile device associated with the user, asking the user whether or not he wishes to perform the action. The user sends a permission response via the mobile device to the authentication service, granting or denying the action. The user is provided with an option to automate future similar responses so long as at least one automation criterion is met (e.g., the physical location of the mobile device), eliminating the need to manually provide a response to future permission requests. Information necessary to determine whether the automation criterion is met is stored locally on the mobile device, in some embodiments. In other embodiments, such information may be transmitted to the authentication service.

When an authenticating service (e.g., a web site that requires a login or a car security computer) needs to authenticate a user action, an authentication request is sent to an authentication service. If the authentication request has been sent out by an authenticating service, then typically a first authentication factor has already been provided. In the case of a web site, the first factor is normally a username/password combination. In the example of a car security system, the first authentication factor might be a signal from a key. The authentication method shown in FIG. 1 provides a streamlined process for providing a second factor of authentication to augment the security provided by the first factor. The various authenticating services described herein are exemplary only and are not intended to limit the scope of the present disclosure. Indeed, throughout the specification reference is made to the action of logging on to an exemplary web service; however, it is understood that this is merely one action that may be authorized in various embodiments.

One way in which the process is streamlined is by eliminating the need for repeated authentication grant/deny permission responses by the user. In some embodiments, this is achieved by utilizing location awareness technology, a capability that most modern mobile devices already include. Location awareness provides one way to further automate the authentication process and eliminates the need for repeated grant/deny actions, allowing the user's mobile device to remain stowed away in a pocket, a purse, or on a docking station near the user, for example. This may increase user satisfaction with and/or adoption of multi-factor authentication, relative to systems in which the user must authorize each action using their mobile device.

This may be possible because there is an intuitive pairing between an action, such as logging on to a service for example, and the physical location from which the action is initiated. For instance, a user will typically check his email using a given device from a small subset of places (e.g., home, work, the local coffee shop). When the user attempts to login from a known device when he is at one of these locations, the probability that it is a valid request significantly increases. Thus, these permission responses from familiar locations may be automated by using the authentication application to "teach" the mobile device which types of requests should be automated. Stated differently, the user's mobile device "learns" which authentication requests to automate so that the user does not have to repeatedly perform a grant/deny action to send a permission response. In other embodiments, the authentication service may similarly lean what requests to automate, and, based on contextual information transmitted from the user's mobile device, may automate authorization without even transmitting a permission request to the mobile device.

The learning process may be implemented in several ways. For example, the learning process may be as simple as asking the user if a given authentication request should be automated, or it may involve some additional automation mechanisms to streamline the user experience. For example, the mobile device may be put into a learning mode that automatically grants the authentication requests it receives and stores the locations where the requests were received. The learning process may be implemented in many other ways as well. Once authenticating service, location, and mobile device have been associated (i.e., learned) the system may automatically respond when a similar request is presented in the future without prompting the user for any additional action. The method/system may provide a quick and easy way for automation of a robust and unobtrusive second authentication factor. Various contextual information may be used in addition to or in place of location information, in various embodiments.

Figure 2:
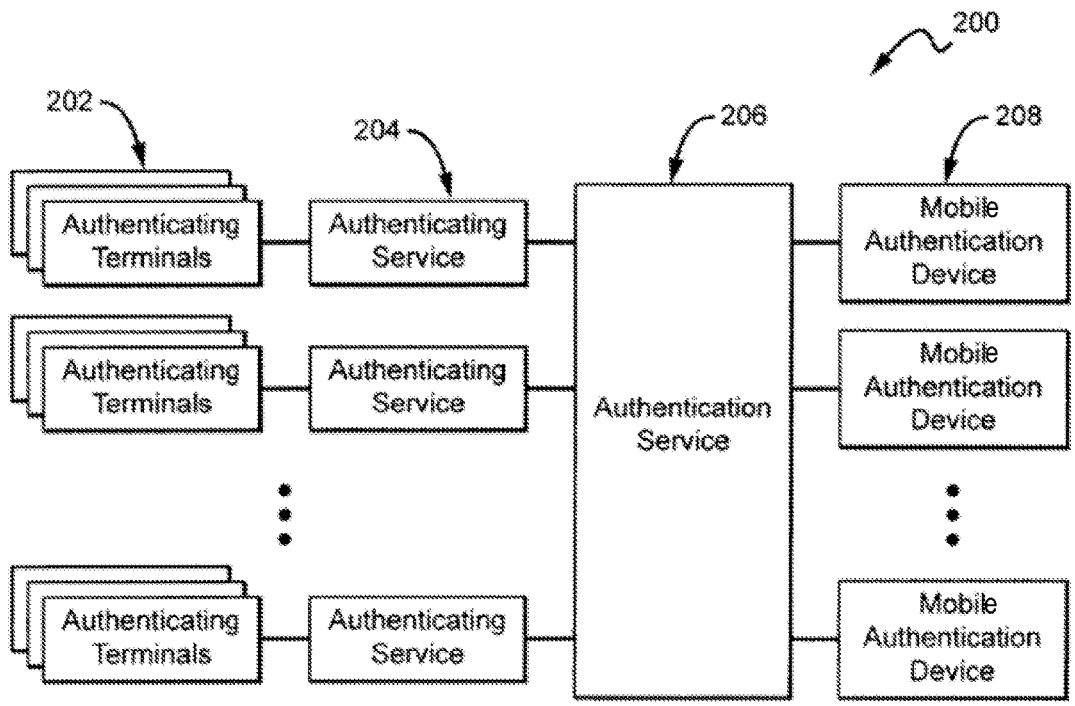
FIG. 2 is a diagram showing an authentication system, according to some embodiments.

FIG. 2 is a diagram showing an authentication system 200 comprising components according to some embodiments. A user may use one or more authenticating terminals 202 (e.g., a home computer, a work computer, a laptop at the coffee shop) to access an authenticating service 204 (e.g., a third party website). In some embodiments, a first authentication factor (e.g., a password) is communicated from an authenticating terminal 202 to the authenticating service 204. The authenticating service 204 communicates with the authentication service 206 to verify a user action. In some embodiments, this is done by sending a permission request to a mobile authentication device 208 associated with the user. The user uses the mobile device 208 to send a permission response to the authentication service 206 which is passed along to the authenticating service 204, providing the second factor of authentication. Future permission responses may be automated via the mobile device 208. Each of the authenticating terminals 202, the authenticating services 204, and the mobile devices 208 are assigned a universally unique identifier (UUID) that is used to identify it within the authentication service 206, in some embodiments.

Embodiments of the methods and systems may utilize two important actions: pairing and authentication.

Pairing

In order for a mobile authentication device 208 to authenticate an authenticating service 204, the two first may be paired together. The pairing process includes the communication of any information that is required for subsequent authentication requests to succeed. For example, if the authenticating service 204 wishes to require one-time-passwords (OTP) to validate authentication requests, the pairing process may establish a shared secret (similar to an encryption key) between the mobile authentication device 208 and the authenticating service 204. When a subsequent authentication request is made, the mobile authentication device 208 will use this shared secret to generate the OTP, and the authentication service will use it to verify that the OTP is correct. The pairing process may require additional information as well (e.g., cryptographical keys, digital signature information, etc.). The pairing process may also establish a unique identifier for the pairing that will be included in future authentication requests. Mobile devices 208 may be configured to discard authentication requests that do not contain a known, valid pairing identifier.

Figure 3A:
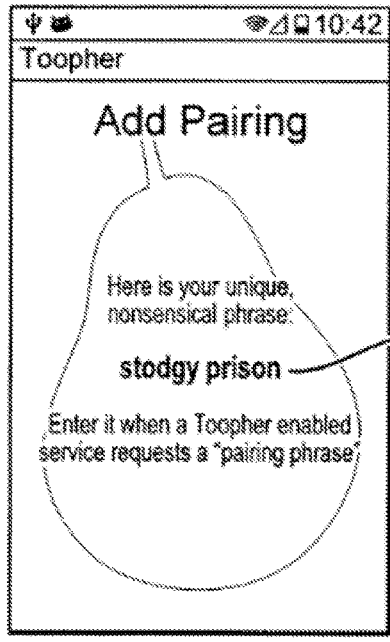
FIGS. 3A-3C show a series of screen shots from an exemplary mobile authenticating device, according to some embodiments.
Figure 3B:
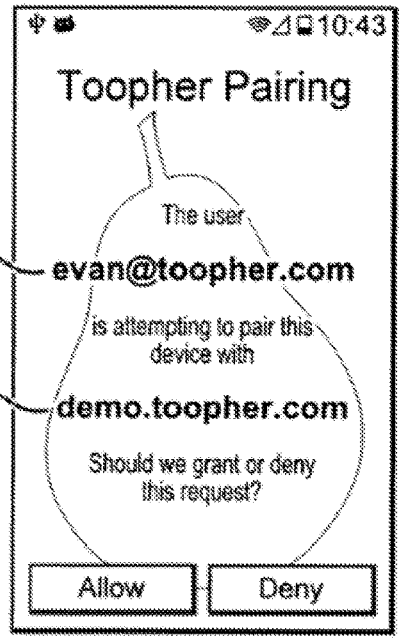
Figure 3C:
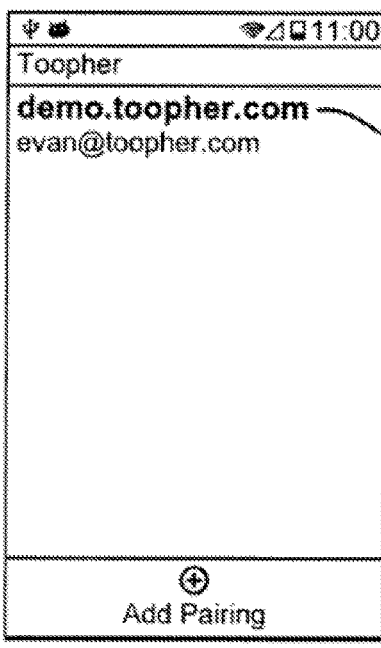

FIGS. 3A-3C show a series of screen shots 300, 310, 320 from an exemplary mobile authenticating device 208 running an application of the authentication service 206 on an Android operating system. In FIG. 3A, the screen shot 300 shows a pairing phrase 302 which has been generated by the mobile device 208. The user then enters the pairing phrase at the authenticating terminal 202. Then the authentication service 206 pushes a pairing request to the mobile device 208 as shown in the screen shot 310 in FIG. 3B. The pairing request includes the user name 312 and the authenticating service name 314 so that the user has the information necessary to verify the pairing before granting it. The screen shot 320 in FIG. 3C shows that the mobile device 208 has successfully paired with the authenticating service 204. The authenticating service name 314 now appears in the paired service list.

Figure 4A:
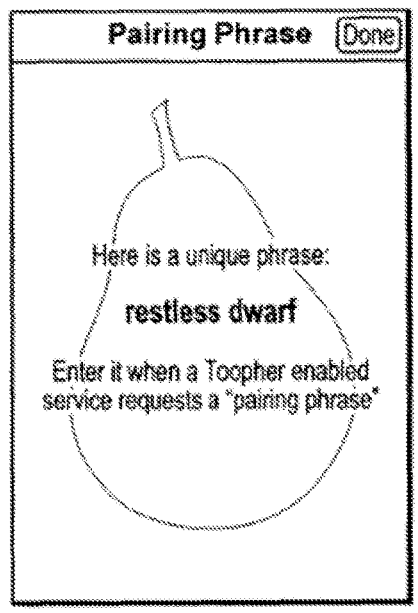
FIGS. 4A-4C show a series of screen shots from an exemplary mobile authenticating device, according to some embodiments.
Figure 4B:
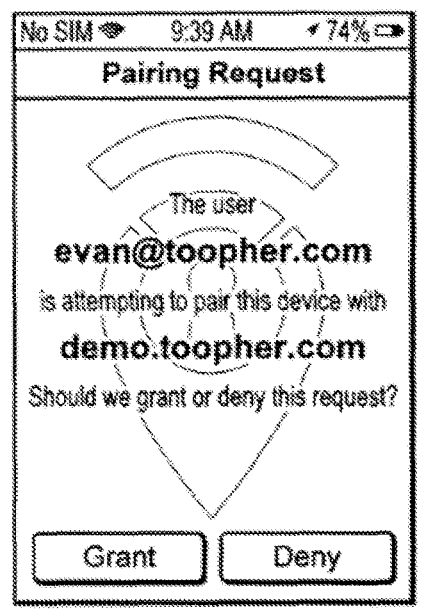
Figure 4C:
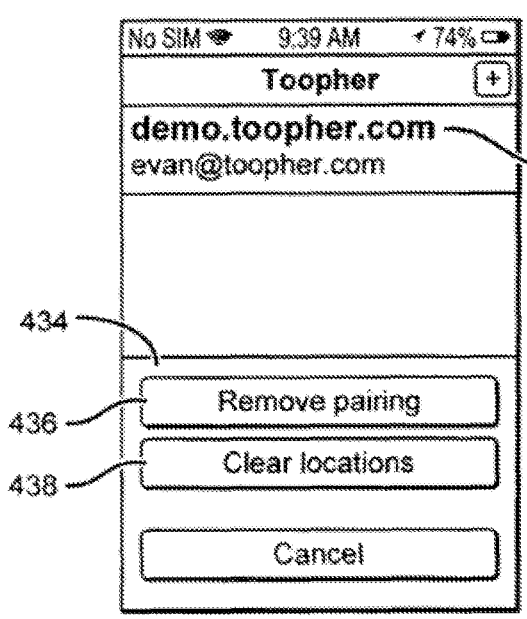

FIGS. 4A-4C show a similar set of screen shots 410, 412, 414 exemplifying the pairing process on an mobile device 208 running an application of the authentication service 206 on an iOS platform. FIG. 4C shows the paired service list where the authenticating service name 432 has been selected. The pop-up dialogue box 434 allows the user to un-pair the mobile device 208 from the authenticating service 204 with the "Remove pairing" button 436 or to clear the pairing list entirely with the "Clear locations" button 438.

Authentication/Authorization

As used herein, the term "authentication" is intended to be construed according to its well-understood meaning in the art, which includes determining that a user is who they claim to be, e.g., the owner of a particular account. In some embodiments, authentication is performed using a mobile device owned by the relevant user. Note that authentication may not be performed to a certainty, but is generally based on a high probability that the user is who they claim to be, based on one or more authentication factors. As used herein, the term "authorization" is intended to be construed according to its well-understood meaning in the art, which includes signaling that an action is allowed. Exemplary authorized actions include, without limitation: login to an account, performance of a transaction, access to data, physical access to an area or vehicle, etc.

In various embodiments, a user is authenticated in order to authorize the user to perform an action. Thus, in describing various embodiments, the term "authentication" may be used to indicate that some action is authorized based on an authenticated user response, whether manual or automated.

Thus, when various embodiments are described herein as used for authentication, the authentication may also be used for authorization of any appropriate action, whether or not an action or authorization is explicitly mentioned.

After a mobile device 208 has been paired with an authenticating service 206, the actual authentication may occur whenever the authenticating service 206 wishes to verify an action to be performed by a user. This will typically involve receiving an authentication request to perform an action at which point the authenticating service 206 may verify the authenticity of the request before communicating to the authenticating service 204 that it is permitted to perform the action. As one possible example, a user may use his laptop to attempt to log in to a web-based email service. Here, the laptop is the authenticating terminal 202 and the web-based email service is the authenticating service 204. The authenticating service 204 will likely, but not necessarily, require the user to present some kind of first factor authenticating information (e.g., a password). Using embodiments of methods and systems disclosed herein, the authenticating service 204 is configured to provide the user with an additional second factor for authentication, and so it then initiates an authentication request through the authentication service 206 and provides the appropriate pairing identifier for the user that is attempting authentication. The authentication service 206 sends a permission request to the appropriate mobile authentication device 208 that responds with permission response as outlined herein. As previously noted, the permission response may be generated automatically or manually. Authenticating service 204 and authentication service 206 may or may not be controlled by the same entity, in various embodiments.

In the automated response mode, the mobile authentication device 208 is configured to check an internal database and determine if the authentication request matches at least one automation criterion. There are many options for selecting the criteria for automation, and the mechanism may allow for an authenticating service 204 to flexibly specify an automation policy. In one exemplary embodiment, the authenticating service 204 will allow the user to specify that a certain type of permission request should automatically generate a grant/deny permission response when the mobile authentication device is within a certain proximity of a stored location, and an authentication request is received indicating that it is coming from the same terminal identifier used to originally store that location. This represents an intuitive pairing between the terminals 202 used to log in to an authenticating service 204 and the location of the mobile authentication device 208 when the authentication request is made. If automation is possible, the instruction (grant or deny) is encapsulated in a permission response which is sent to the authentication service 206. This response may optionally include a currently valid OTP to further verify the mobile device 208, along with traditional encryption and digital signature mechanisms, in some embodiments. This automation may avoid the need for a user to pick up their device, enter an OTP generated by the device into a terminal, etc.

In various embodiments, if a received permission request does not match a known automation database entry, the permission response may default to denial, or the mobile device 208 may simply prompt the user for manual entry of the permission response.

Manual generation of the permission response may be used when automation cannot be achieved (e.g., a bad location signal or low-bandwidth communications signals) or is otherwise undesirable. If this is the case, the user will be prompted for the permission response. In addition to requesting the permission response, some embodiments also include the ability for the user to indicate that similar future requests should receive the same authentication decision (as described above) at the same time the user is prompted for the permission response.

FIGS. 5A-5B show screen shots 500, 520 of a mobile device 208 presenting a permission request that requires entry of a manual permission response, according to some embodiments. The screen shot 500 shows a permission request displayed on mobile device 208 that is running an Android operating system. In this embodiment, the permission request includes a designator of the authenticating service 502 (demo.toopher.com in this example), an action description 504 (login, in this example), a user name 506 (evan@toopher.com, in this example), and a terminal description 508 (macbook-retina, in this example). Having been presented with the relevant information to inform an authentication decision, the user may either grant or deny the permission request using the corresponding buttons 510, 512. If the user would like to automate generation of the permission response to similar future permission requests without prompting the user to grant or deny the automate response, the user may select button 514. If automation is activated, device 208 may update the automation database with the location of the mobile authentication device 208 (or any other contextual information) at the time of the permission request, which may be used to generate future permission responses.

Examples of contextual information that may be relevant to automation state may include, without limitation: location, acceleration, velocity, ambient noise, lighting conditions, biometrics, time, altitude, air pressure, wired or wireless connectivity state (e.g., via Wi-Fi, Bluetooth, near-field communications, etc.), temperature, etc. Other examples of contextual information, in the context of wearable devices, may include whether a wearable device is actually being worn, whether the wearable device is being worn by the user (e.g., based on biometric information), whether the wearable device is within a particular proximity of another device (e.g., whether a smartwatch is within 2 meters of a mobile phone), etc.

FIG. 6 shows a flow chart of operations that may be performed by the mobile device 208 for authenticating a permission request according to some embodiments. The mobile device receives a permission request from an authentication service 206. Information related to the permission request is presented to the user. The information may be presented visually on a screen, audibly by text-to-voice applications, or by other methods. The mobile device 208 is configured to receive input from the user to determine the permission response. Input may include tactile input (e.g., pushing a button), verbal input, or kinds of input. The mobile device 208 then sends the permission response to the authentication service 206. The mobile device 208 may also receive input from the user to automate the permission response for future, similar permission requests (e.g., for the same action or for actions in a class of actions) as discussed herein.

As previously noted, the exemplary methods and systems discussed herein have focused on login actions to a web site. However, the authentication methods and systems described may be applied to any situation where access or actions need to be authenticated over a computer network. For example, in some embodiments the disclosed techniques may improve vehicular security by using the location awareness of the vehicle itself and including it as a component in an authentication request. In these embodiments, the mobile device may be configured to not grant the permission request unless it and the vehicle are in close proximity to each other. Another embodiment may include transaction verification, such as providing a means for credit card processors to verify all or a subset of credit card transactions.

Furthermore, physical access controls may be augmented by only allowing access if a paired mobile device is in proximity to the point of entry. Such access controls may further be improved by using this method as a means for authorization, where one or more additional paired devices must approve a request for entry to be granted, for example, a maintenance worker attempting to enter a plant floor may request entry along with a work order, which is transmitted to a plant manager's mobile device for explicit approval before access is granted.

The methods and systems of authentication described herein may also be paired with other more secure factors of authentication. For example, a biometric authentication factor (e.g., a retinal scan, a fingerprint, a voice profile, etc.) may be required in concert with a permission response from the mobile device for those applications requiring heightened security, such as military field operations. Security may increase exponentially with each added layer of authentication. The following discussion covers various exemplary implementations of the techniques discussed above for particular use cases.

Pre-Seeded Permission Responses

In some embodiments, mobile authentication device 208 is configured to pre-seed a permission response when the state of the automation criterion changes. For example, mobile device 208 may pre-seed a permission response in response to determining that the mobile device 208 has entered a particular geographic region (e.g., corresponding to the user's residence. In some embodiments, this allows the authentication service 206 to respond appropriately (which may include granting or denying requests) without the need to contact the mobile device on-demand. For example, the criterion automation state may change when the mobile device enters or exits geographic regions where the permission response has been automated. This particular kind of pre-seeding method is known as "geo-fencing." Many other methods may be used to pre-seed an automated permission response, in various embodiments. In some embodiments, preemptively sending an automated permission response may reduce automation latency.

Pre-seeding as described above allows, in some embodiments, the mobile authentication device 208 to send a preemptive authorization response to the authentication service 206 which pre-authorizes certain types of actions. (A "preemptive" response as used herein refers to a response that is sent by a first device (e.g., mobile authentication device 208) to a second device (e.g., authentication service 206) without the first device receiving a request for that information from the second device. A response that is sent by a first device in response to a request from a second device is thus not a preemptive response.) A preemptive response may be sent, for example, in response to a change in automation state. "Automation state" refers to a set of values of various criteria used to determine if a response by mobile authentication device 208 should be automated or not. For example, a set of information specifying the location of device 208 may be one component of that device's automation state. A change in the location of device 208 (e.g., the mobile phone being carried outside a specified geographical region) may cause a change in that device's automation state in some instances. Similarly, the mobile authentication device 208 may later (preemptively) revoke the preemptive authorization in response to another change in automation state. In response to preemptive authorization, the authentication service 206 is configured to respond to permission requests from authenticating service 204 without communicating with the mobile authentication device 208. Thus, when preemptive authorization for an action is indicated, there is no need for authentication service 206 to send a message to mobile authentication device 208 to determine whether the user of device 208 or software running on device 208 wishes to authorize that action.

In some embodiments, mobile device 208 is configured to revoke the preemptive permission request in response to a change in automation state. In location-based embodiments, mobile device 208 may be configured to determine location using a satellite navigation system such as the global positioning system (GPS), based on signals from cellular base stations (e.g., using triangulation or simple proximity), based on signals from one or more wireless access points, etc. The geographic region for preemptive permission responses may be selected by the user or may correspond to previous approved permission responses, for example. Similarly, the user may select what actions to preemptively authorize for a particular geographic region.

In some embodiments, authentication service 206 is configured to revoke the preemptive permission request in response to determining that it is no longer in communication with mobile device 208. In this situation, the automation state of mobile device 208 may have changed without mobile device 208 being able to indicate the change, for example. In some embodiments, mobile device 208 is configured to send periodic preemptive permission responses using a time period between responses known to or derivable by the authentication service 206. In these embodiments, the authentication service 206 may be configured to revoke preemptive automatic permission responses for mobile device 206 after an interval corresponding to the time period has elapsed.

Figure 7A:
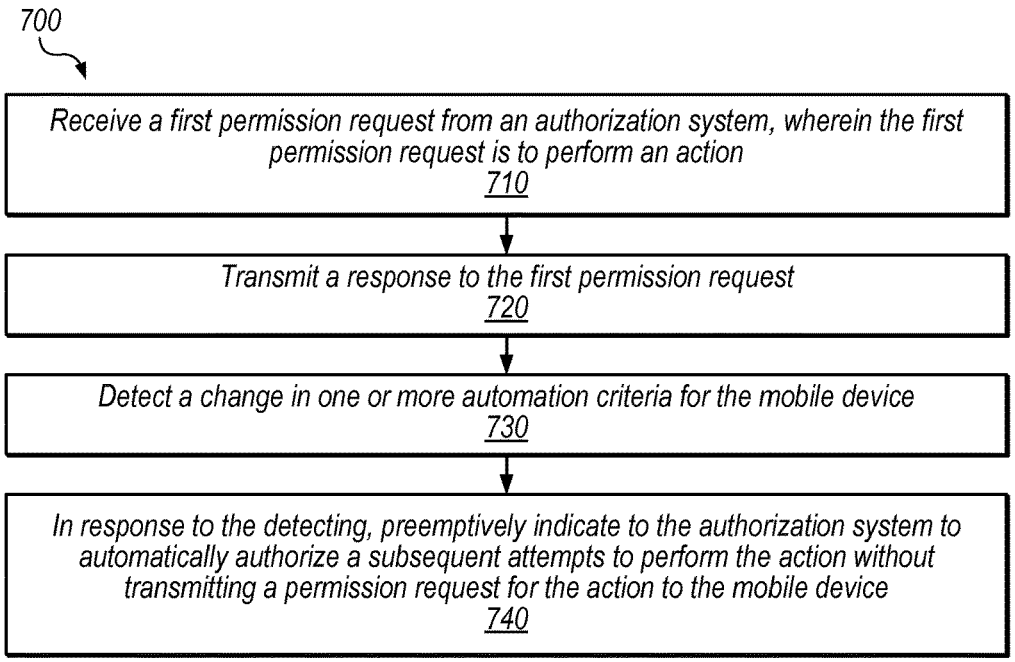
FIG. 7A is a flow diagram illustrating a method for generating preemptive permission responses, according to some embodiments.

FIG. 7A is a flow diagram illustrating a method for generating preemptive permission responses, according to some embodiments. The method shown in FIG. 7A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, a mobile device receives a first permission request from an authorization system, where the first permission request is to perform an action. The permission request may be any factor in a multi-factor authentication process. That is, the permission request may correspond to the first factor in a multi-factor authentication process, the third factor, etc.

At 720, the mobile device transmits a response to the first permission request. The mobile device may transmit the response based on user feedback granting or denying the first permission request or automatically respond based on one or more automation criteria. The authorization system may authorize the action if the user grants the request.

At 730, the mobile device detects a change in one or more automation criteria for the mobile device. For example, the mobile device may detect that the mobile device has entered a particular geographic region. In this example, the mobile device may make this determination based on GPS data, cell tower data, proximity to an access point, etc. The particular geographic region may correspond, without limitation, to a residence or work site of the user. In other embodiments, the change in automation criteria could include a change in connectivity to another device, a change in biometric information associated with the user, etc.

At 740, in response to detecting the change, the mobile device preemptively indicates to the authorization system to automatically authorize subsequent attempts to perform the action without transmitting a permission request for the action to the mobile device. In some embodiments, the preemptive indication is usable by the authorization system to automatically authorize a subsequent attempt to perform the action without having to transmit a permission request to the mobile device. In these embodiments, the authorization system may automatically respond to permission requests addressed to the mobile device (at least for the particular action or for a set of related or indicated actions) until the device leaves the particular geographic region. The authorization system may determine that the device is still in the geographic region by determining that it is still in communication with the mobile device and/or based on periodic updates from the mobile device, for example. The disclosed embodiments may reduce the time taken to automatically respond to a permission request relative to sending permission requests to the mobile device and/or may facilitate performance of the disclosed response automation techniques when using certain application programming interfaces (APIs).

Figure 7B:
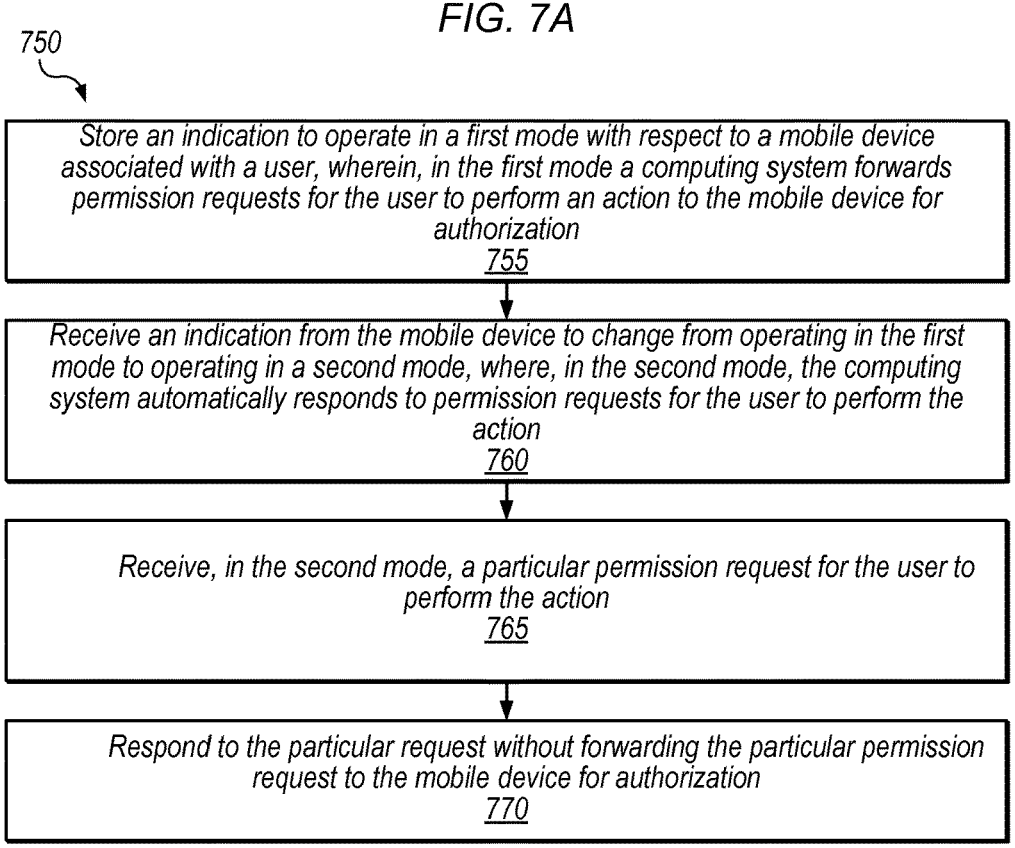
FIG. 7B is a flow diagram illustrating a method for using preemptive permission responses, according to some embodiments

FIG. 7B is a flow diagram illustrating a method for using preemptive permission responses, according to some embodiments. The method shown in FIG. 7B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 755.

At 755, a computing system (e.g., authentication system 206) stores an indication to operate in a first mode with respect to a mobile device associated with a user. In this embodiment, the computing system is configured to forward permission requests for the user to perform an action to the mobile device for authorization.

At 760, the computing system receives an indication from the mobile device to change from operating in the first mode to operating in a second mode, where, in the second mode, the computing system automatically responds to permission requests for the user to perform the action. In some embodiments, the device may send the indication in response to one or more automation triggers. For example, the mobile device may be configured to send the indication in response to entering a particular geographic region, as discussed above with reference to FIG. 7A. In various embodiments, any of various changes in automation state (e.g., changes in one or more automation criteria) may be used to trigger preemptive permission requests.

At 765, the computing system receives (e.g., from an authenticating service 204), in the second mode, a particular permission request for the user to perform the action. At 770, the computing system responds to the particular request without forwarding the particular permission request to the mobile device for authorization. In this manner, the indication to enter the second mode of operation may serve as a preemptive permission response for the one or more second permission requests. The automatic response may be a grant or a denial, e.g., based on past user configuration.

In some embodiments, instead of sending a preemptive permission response, the mobile authentication device 208 may transmit various types of contextual information to authentication service 206. For example, device 208 may transmit location information, biometric information, movement information, time information, ambient noise information, etc. In some embodiments, device 208 is configured to transmit this information periodically. In some embodiments, authentication service 206 is configured to determine whether to automate permission responses and is configured to respond to permission requests by authenticating service 204 without consulting device 208, e.g., based on information previously received from device 208. For example, if authentication service 206 determines that device 208 is in an expected location near a login terminal and is not moving rapidly (e.g., based on information periodically received from device 208), then authentication service 206 may automatically respond to permission requests to authenticate to the login terminal without pinging device 208. Speaking generally, any of the various techniques for automated responses discussed herein as performed by mobile device 208 may be performed by the authentication service 206, in these embodiments. In these embodiments, if the authentication service 206 determines that an automated response should occur, it may automate the response and may not send a corresponding request to the mobile device 208 at all.

Automation Criteria Included in Permission Requests

In some of the embodiments discussed above, mobile device 208 is configured to determine what automation criteria should be satisfied before automating responses (e.g., based on user input specifying the criteria). In other embodiments, authentication service 206 may determine the set of one or more automation criteria to be satisfied before authorizing a particular action. In some embodiments, authentication service 206 includes information specifying this set of automation criteria to the mobile device 208 and the mobile device 208 is configured to automatically respond if the set of automation criteria is met. If the criteria are not met, mobile device 208 may reject the permission request or prompt a user for manual confirmation.

For example, authentication service 206 may transmit a permission request to mobile device 208 that specifies that the mobile device 208 can automatically respond (without prompting a user for input) to permission requests when mobile device 208 is in a particular geographic region. Authentication service 206 may receive sets of one or more automation criteria for various actions from an administrator and/or a user. In some embodiments, the authentication service 206 may alter the set of automation criteria for a given action, e.g., based on a change in configuration parameters from an administrator or user. Another example of an automation criterion for these embodiments may include whether mobile device 208 is in communication with another computer device (e.g., a wearable device) via a short range connection. In other embodiments, any of the various disclosed automation criteria may be utilized.

FIG. 8A is a flow diagram illustrating a method for receiving automation criteria in permission requests. The method shown in FIG. 8A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 810.

At 810, a mobile device receives a first permission request from an authorization system. In some embodiments, the first permission request is a request to perform an action and the first permission request specifies a first set of one or more automation criteria.

At 820, the mobile device automatically responds to the first permission request in response to determining that the first set of one or more automation criteria are satisfied for the first permission request. The disclosed techniques may allow authentication service 206 to control the set of automation criteria used to automate responses in place of or in addition to mobile device 208, in some embodiments.

In some embodiments, the method further includes the mobile device receiving a second permission request from an authorization system, wherein the second permission request is a request to perform the action, and wherein the second permission request specifies a second set of one or more automation criteria (which may be the same as or different than the first set). In some embodiments, the method further includes prompting a user for response to the second permission request in response to determining that the second set of one or more automation criteria are not satisfied for the second permission request.

FIG. 8B is a flow diagram illustrating a method for including automation criteria in permission requests. The method shown in FIG. 8B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 855.

At 855, a computing system (e.g., authentication service 206) receives information indicating a request by a user to perform an action. For example, the user may attempt to login to an account via terminal 202.

At 860, the computing system determines a set of one or more automation criteria under which a mobile device associated with the user should respond to a permission request to perform the action. The criteria may include any of various criteria disclosed herein, among others. For example, the criteria may include a criterion that the mobile device is in a particular location.

At 865, the computing system transmits a first permission request to the mobile device associated with the user, and the first permission request specifies the set of one or more automation criteria.

At 870, the computing system receives a response to the first permission request. In some embodiments, the response is automatically generated by the mobile device based on the set of one or more automation criteria without prompting the user for input to accept or deny the first permission request. For example, the response may be automatically generated by the mobile device by determining the one or more automation criteria (e.g., decoding the received permission request) and determining whether the criteria are satisfied (e.g., determining whether the mobile device is at the particular location).

Gesture Based Authentication/Authorization

In some embodiments, mobile device 108 is configured to automated permission responses based on a user gesture. For example, an application on device 108 may ask the user for an application-level gesture-based response to authenticate/authorize the response to the challenge. In some embodiments, the gesture may indicate that future similar permission requests should be automated. For example, if the user performs a particular gesture in response to the display shown in screenshot 500 (e.g., shaking their mobile device), mobile device 108 may automatically check box 514 without actually requiring user input to check the box.

In other embodiments, device 108 is configured to require re-performance of the gesture before granting future similar permission requests. For example, if the user waves his or her hand in a circle pattern in from of a camera of device 108, device 108 may require a similar wave gesture before authenticating subsequent permission requests.

Many different gesture-based responses are possible. The gesture may involve physical interaction with the mobile device(s), whether through contact or contextual information via the mobile device including but not limited to touching the mobile device(s), interacting with the optical or aural sensors (e.g., cameras, microphones), and interacting with movement sensors (e.g., the accelerometer). Other methods of interacting with the mobile device are also contemplated, and may depend on the available hardware for a given mobile device.

Contextual Responses Through SMS Channels

In some embodiments, contextual information and data is transmitted through the short message service (SMS) channel to at least one mobile device to aid in the authentication/authorization process and contextual information from said mobile device(s) is used to create an automated authentication/authorization process in the future. This information may include, but is not limited to, a user's identity, an action, a service, a web service, a network, an application, a location, a time, a date, at least one device identity, at least one device location, an IP address, and/or any combination thereof. Through the transmission and display of this information and data, users may make better decisions. Some embodiments allow a user to depend on this information and data and then transmit a response back through the SMS channel, thereby creating an out-of-band authentication/authorization process.

In one embodiment, a challenge is sent to a mobile device through the SMS channel, which requires a user to respond to the request. Upon transmission of the challenge, contextual information and data is sent via the SMS channel and displayed on at least one mobile device. This contextual information and data may include (but is not limited to) user identity, action, web service, and the requesting device identity. The user then depends on this information to make a decision as to whether or not the request is valid, authentic, genuine, legitimate, and/or accurate. Upon deciding based on the transmission and display of this information and data through the SMS channel on at least one mobile device, the user may respond to the challenge through the SMS channel and/or use the additional one-time password to respond through an in-band channel.

Additionally, relying on contextual information available to at least one mobile device, the user may opt to automate this response, based on the information and data transmitted through the SMS channel and displayed on at least one mobile device. Using this contextual information, which may include (but is not limited to) the location of at least one mobile device, Bluetooth stations, wifi stations, NFC stations, radio stations, RFID stations, ambient sound, ambient light, biometric information, kinetic stations (e.g., information gathered/processed through at least one accelerometer), time, temperature, barometer, or altimeter, thereby allowing at least one mobile device to respond automatically to similar responses in the future and not requiring the user to respond to similar requests in the future.

Automated Un-Authentication and/or Un-Authorization and Re-Authentication and/or Re-Authorization In some embodiments, a virtual "halo" may be established using contextual information received or determined by at least one mobile device. In some embodiments, the authentication service 106 and/or mobile device 108 apply rules to this information to automatically prompt a user on at least one mobile device, to automatically un-authenticate a session or action via at least one mobile device, and/or to automatically re-authenticate a session or action via at least one mobile device.

In one embodiment, a request is sent to at least one mobile device, and the user opts to automate an authentication response to the request going forward using contextual information received, detected, and/or processed by at least one mobile device. When the user, with his or her mobile device, leaves the previously authenticated area (which may be customizable, e.g., in size by the mobile device), the user may either be prompted via at least one mobile device to end active sessions, or at least one mobile device may automatically end said user's active sessions. Similarly, when the user returns to an area in which an authentication session was previously active, the mobile device may automatically restore an authenticated session for the user.

Additionally, upon re-entering the previously authenticated area, the user may either be prompted via at least one mobile device to re-establish previously ended sessions, or at least one mobile device may automatically re-establish said user's previously ended sessions. In other embodiments, any of various changes in contextual information may be used to automatically re-authenticate or log out (and/or adjust what types of permission requests to which the mobile device is configured to automatically respond). For example, changes in the velocity of the mobile device, changes in the network connectivity state of the mobile device, etc., may be used to trigger ending a user's active authenticated session.

Kinetic-Based Authentication and/or Authorization

Kinetics may be applied to the application level authentication and/or authorization as at least one factor of authentication and/or authorization. Said kinetic may involve physical movements and/or interactions with at least one mobile device, whether through contact, possession, or proximity via at least one mobile device (including, but not limited to touching and/or tapping at least one mobile device, movement with at least one mobile device), and/or interaction with movement sensors (including but not limited to accelerometer) of at least one mobile device.

In one embodiment, a challenge is sent to a mobile device, which requires a user to respond to said challenge. Upon granting or denying said challenge, the application requiring the challenge asks the user of the mobile device for a kinetic-based response to authenticate and/or authorize the response to the said challenge.

In another embodiment, a challenge is sent to a mobile device, which requires a user to respond to said challenge. Upon granting or denying said challenge, the application requiring the challenge asks the user of the mobile device for a kinetic-based response to authenticate and/or authorize the response to the said challenge. Given the kinetic-based response, any future requests similar in nature may be automatically responded to via at least one mobile device without requiring additional prompting of said user.

Multiple Mobile Device Authentication and/or Authorization

Using at least two mobile devices to authenticate and/or authorize a challenge. The response to the authentication and/or authorization challenge relies on an interaction between at least two mobile devices. This interaction may be facilitated by but not limited to the following: NFC, Bluetooth, WiFi, location-awareness, Internet protocol, SMS, push notifications, and telephony and/or any combination. These mobile devices may include, but are not limited to communication devices, wearables (watches, glasses, etc.), POS terminals, and computing devices and/or any combination.

In one embodiment, a challenge (e.g., permission request) is sent to a mobile device, which is then either relayed to another mobile device and/or a challenge is issued to another mobile device to confirm the presence of the second mobile device. Upon either receipt of confirmation of the presence of the second mobile device, or by the challenge response of the second mobile device to the first mobile device, a response to the initial challenge may be determined. In some embodiments, similar techniques may be used to automate responses to future challenges.

For example, consider a situation in which a user stores their phone in a pocket and wears a smartwatch on their wrist. In this situation, upon receiving a permission request, the phone may automatically respond based on one or more criterion associated with the watch. For example, if the phone is connected to the watch and the watch is within a particular distance of the phone (e.g., within two meters), the phone may automatically respond to certain permission requests. In some embodiments, the phone may forward permission requests to the watch, which may in turn automatically respond or prompt the user for input. In some embodiments, the watch may be used to determine biometric information to confirm the identity of the user. These may add further authentication security and avoid authentication in situations where a phone is stolen, for example.

Centralized Administration of Hosted and/or on Premise Authentication/Authorization Services Some embodiments may use a centralized administrator to manage hosted and/or on premise authentication and authorization services. This centralized administration applies to either or both the user-level administration of hosted and/or on premise authentication/authorization services and/or client-level administration of hosted and/or on premise authentication/authorization services. This centralized administration may enable either or both users to manage all aspects of the functionality and features of their accounts. On the user-side of the administration, users may manage any and all accounts they have previously paired. Additionally, users may add pairings to their account from this centralized administration. On the authenticating service system side of the administration, service systems may add/remove services through which their users may pair, as well as the addition, provisioning, and/or deletion of users.

For example, in one embodiment a user may log into the centralized administration portal to change contextual information setting to their account. In another example, a service system may log into the centralized administration portal to add a user to its service.

Authentication/Authorization VIA Push Notification Channel from an on-Premise Location In some embodiments, authentication/authorization challenges may be sent over a push notification channel from an on-premise installation. An on-premise installation may include, for example, a virtual machine installation or a non-virtual machine installation. The characteristic common to on-premise installations is that they do not utilize hosted deployments and often involve physical installations at an authenticating service system site.

For example, in one embodiment a user may attempt to log into a VPN by sending credentials through a browser. The credentials are relayed from the browser to the authenticating service system. Upon verification of the credentials, the service system sends a request to an on-premise solution (instead of a hosted solution), at which point the on-premise solution challenges the user via an out-of-band authentication request. The user manually or automatically responds to the challenge, and the response is sent back to the on-premise installation. The on-premise solution then sends the response back to the authenticating service system. With that data, the authenticating service system may decide whether or not to allow the user access.

Aggregation and Use of Results Derived from Data Generated by Authentication/Authorization Requests In some embodiments, through the course of sending and receiving authentication/authorization requests, proprietary data may be aggregated related to users, clients, sessions, actions, transactions, and/or any contextual information associated with the challenges and the responses to said challenges.

For example, in one embodiment a user may attempt to login into a VPN by sending credentials through a browser. The credentials are relayed from the browser to the authenticating service system. Upon verification of the credentials, the service system sends a request to an on-premise solution, at which point the on-premise solution challenges the user via an out-of-band authentication request. The user manually or automatically responds to the challenge, and the response is sent back to the on-premise installation. The on-premise solution then sends the response back to the authenticating service system. With that data, the service system may decide whether or not to allow the user access. The data from these transactions may then be aggregated and used. Examples of the data to be aggregated include: the value of the response (yes/no); the method of response (automated/manual); the context (time, date, location, terminal ID, etc.); the service (site ID, network ID, etc.); and the action (login, logout, transfer, purchase, submission, etc.). The above data are merely exemplary. It is understood that any data generated by these transactions may be aggregated and used for many different purposes.

The Automatic Transition/Upgrade from OTP Pairings

Some embodiments provide the ability to pair with both naked OATH (Initiative for Open Authentication) enabled authentication processes and the more sophisticated authentication processes described herein. It is possible to transition and/or upgrade a naked OATH pairing to a pairing without involving the user, only the acceptance of the authenticating service or network. As a result, it is possible to seamlessly and invisibly, and with minimal friction to the user, transition and/or upgrade OATH pairings to other authentication systems that are not pure naked OATH one-time password (OTP) generators, which specifically require a user to input a one-time password manually.

In one embodiment, a user connects the authentication service to a website that does not support anything more than naked OATH OTPs. The website then decides to support one or more authentication services that are not pure naked OATH OTP generators. The user may now use all functionality of the authentication service at the next authentication instance with little or no interaction with the web service or application.

Building, Using, Marketing, and Selling Modules for Integrated Identity Access Management, Single Sign on, and Access Policy Management Solution with Out-of-Band Multifactor Authentication/Authorization Some embodiments provide for the construction, use, and marketing of multifactor authentication/authorization modules to integrate with identity access management, single sign on, and access policy management solutions using out-of-band processes on at least one mobile device.

In one embodiment, an enterprise connects the authentication service to the Ping Federate IAM solution as the authentication solution for the platform. The construction of this or any other similar out-of-band multifactor authentication/authorization integrations may be performed with various solution(s) providers.

Software Development Kits for Out-of-Bank Multifactor Authentication/Authorization Some embodiments allow for the construction, use, and/or marketing of multifactor authentication/authorization modules to integrate with third party application clients using out-of-band processes on the at least one mobile device. For example, an enterprise may embed the authentication service software development kit (SDK) into its proprietary mobile application for the use of out-of-band, multifactor authentication/authorization processes with their web service(s). Some embodiments provide the ability to build, deploy, and market out-of-band multifactor authentication/authorization solutions via SDK for the use of integration into third-party applications.

The Use of Biometrics to Authenticate/Authorize

Some embodiments may use biometric information to authenticate/authorize (i.e., sign) an authentication/authorization request via at least one mobile device. This biometric information may include, but is not limited to: fingerprints, facial recognition, voice recognition, retinal scans, palm prints, vein patterns in the hand and/or eye, the way the user moves, the way the user thinks, the way the user breathes, the way the user's moves blood through their body, for example. Any other identifying biometric characteristics may be used to complete an authentication/authorization request from a particular user. Biometric information may also be used in combinations (e.g., voice recognition plus fingerprint) to add additional layers of security.

Many different other types of information that are unique to or strongly indicative of a particular user may be used to complete authentication/authorization requests. For example, the behavior of the user in real or virtual environments may be used as identifying information in the authentication process.

In one embodiment, an authentication request is sent from an authenticating party to the user. The user approves this authentication request by scanning their fingerprint on the at least one mobile device. Thus, some embodiments support the ability to sign or approve an out-of-band multifactor authentication/authorization request using biometric or other information, including the ability to use various pieces of information in combination.

Authenticate/Authorize Automated or Non-Automated Access to a Vehicle

In some embodiments, the authorized action may be access to a vehicle (e.g., by unlocking one or more doors of the vehicle). Vehicles which may be accessed include but are not limited to cars, trucks, sports utility vehicles, motorcycles, recreational vehicles, aircraft, boats, ships, hovercrafts, and spacecraft. In this particular exemplary application, the action to be authorized is permitting access to a vehicle using at least one mobile device via communication channels, including but not limited to SMS, push, telephony, Bluetooth, NFC, RFID, wifi, optical and any and other channels of mobile device communication.

In one embodiment, a user approaches her vehicle and as either the primary, secondary, or $n^{th}$ factor for authentication/authorization, an authentication/authorization request is sent to at least one mobile device to allow access to the vehicle using the processes described herein. The mobile device may be configured to automatically respond to permission requests based on certain automation criteria. This may allow the user to enter the vehicle without having to perform input to the mobile device. For example, the vehicle may send a permission request, via authentication service 106, to the mobile device in response to the user attempting to access the vehicle (e.g., by placing a hand on a door handle). The mobile device may automatically respond to the permission request based on proximity of the mobile device to the vehicle, connectivity of the mobile device to the vehicle (e.g., using Bluetooth), location of the device and/or vehicle, etc. If the criteria are such that the mobile device is configured not to automatically respond, it may query the user for input to approve or deny the request.

In some embodiments, similar techniques may be used authorize starting a vehicle (e.g., via ignition of the engine), accessing a fuel pump, accessing data stored in a vehicle, etc.

Authenticate/Authorize Automated or Non-Automated Access to a Physical Location

In some embodiments, the at least one mobile device may be used to provide automated or non-automated authentication/authorization to any of various appropriate physical locations, such as doors, hallways, rooms, sensitive compartmented information facilities (SCIFs), elevators, escalators, buildings, residences, industrial spaces, government facilities, dormitories, grain elevators, laboratories, and many other kinds of places.

Authenticate/Authorize Automated or Non-Automated Processes at an Automated Teller Machine (ATM)

In some embodiments, the at least one mobile device may be used to provide automated or non-automated authentication/authorization to access an ATM (i.e., the action). For example, a user approaches an ATM and as either the primary, secondary, or $n^{th}$ n factor for authentication/authorization, a request is sent to the at least one mobile device to authenticate/authorize access to the ATM.

Velocity Throttling

In some embodiments, the system may be used to provide velocity-throttling services, e.g., such that repeated login attempts cause login restrictions. This capability may enhance the automated authentication/authorization via the at least one mobile device by allowing additional contextual information, in this case, time and/or timing, to determine whether a response should be issued via at least one mobile device. For example, in the case where a user attempts to perform an action (e.g., log in to a website) repeatedly, the frequency of the login attempts triggers contextual awareness of the at least one mobile device, and the mobile device returns affected responses as per the context of the action attempts.

For example, in some embodiments the mobile device is configured to refrain from automatically responding to permission requests based on the frequency of permission requests. For example, if an account is signed into multiple times in a short interval, the mobile device may require manual confirmation for subsequent logins (even if the username and password was correct for each login) rather than automating responses, even if other criteria (such as location) are met such that the device would normally automate the responses in the absence of the velocity throttling feature. Speaking generally, the velocity information may be used to determine what, how, and/or when an automated response should be issued from the mobile device.

In some embodiments, the mobile device may provide the velocity information to a third party. This may allow the third party to perform various risk-assessment operations, for example. Risk-assessment may include determining the risk that a user will default on a debt, pose a security risk to a restricted area, etc. In some embodiments, the mobile device is configured to monitor the number of incoming permission requests for a particular account and notify a third party if the number is greater than a threshold.

Automated Authentication/Authorization Data to Improve Risk-Based Systems

In some embodiments, the system may be used to provide automated authentication/authorization requests and corresponding results or data to improve the quality and results of risk-based systems. Risk-based systems include but are not limited to risk engines, algorithms, anomaly detection systems, intrusion detection systems, and various other systems designed to determine whether an action is considered valid within a prescribed set of parameters. For example, when a user logs into a website via an automated authentication request, the corresponding data from that authentication request may be logged into a risk-based system to improve the sample volume and quality of future results. Similarly, if a fraudster attempts to log into a website and the true user automates a "deny" response going forward (e.g., based on one or more criteria relating to the fraudster's attempt, such as his or her location). This response may also be logged into the risk-engine for future rules and/or parameters to improve the quality of future results. Speaking generally, contextual information relating to automated permission requests may be provided to a risk-based system and/or risk-based algorithms may be used to determine whether to automate individual responses by the mobile device.

The Use of Contextual Information on at Least One Mobile Device to Aid in an Account Recovery Process In some embodiments, the information determined by the mobile device may be used in an account recovery process, and/or a permission request for account recovery may be automatically handled without user input. For example, if a user wants to recover his or her account information (e.g., because the user has forgotten the password) and in the process of doing so, contextual information determined by at least one mobile device may be used to facilitate the process. For example, the fact that the user's mobile device is at a particular location corresponding to the request for account recovery (e.g., the user's home or business address) may add security to the recovery process. Biometric information may also be useful in the context of account recovery, among other types of information. In some embodiments, satisfaction of one or more criteria relating to contextual information may be required before account recovery is allowed.

The Use of Contextual Information to Aid in the Pairing Process

Systems according to some embodiments may utilize contextual information from the at least one mobile device to aid in the pairing process. For example, a user wants to pair his account with an additional authentication/authorization service and in the process of doing so, contextual information from the at least one mobile device is used to add integrity, certainty, security, and/or expediency to the process. For example, pairing may not be allowed with devices that are in particular locations, such as countries other than the user's home country, for example.

The Use of Contextual Information on the at Least One Mobile Device to Improve the Certificate Authority (CA), SSL/TLS Certificates, and the Web Certificate Process Some embodiments provide for the use of contextual information on the at least one mobile device to improve the process by which a CA issues certificates for secure communication between a web browser and a web server. For example, when the user wants to securely interact via web browser with a server using a certificate, the contextual information from at least one mobile device is used to add integrity, certainty, security, and/or expediency to the process.

The Use of Contextual Information to Improve the Integrity of an Authentication and/or Authorization Response from at Least One Mobile Device In some embodiments, a user wants to authenticate via a smartphone; however the client service requires that the request come from the user's specific smart phone when the phone is in a specified location and within proximity of the Bluetooth signature from the user's additional mobile device.

Piggybacking on a Third Party Integration Via an Extension and/or Plugin

In some embodiments, embodiments of authentication service 206 and/or mobile device 208 may piggyback on third-party integration via an extension and/or plugin. For example, these devices may rely on at least one component of a third party's integration into a network and/or web service authentication and/or authorization process, and use such integration to insert the disclosed techniques into the process using an extension and/or plugin.

In one embodiment, a user wishes to use an application on mobile device 208 to perform the disclosed automatic permission response techniques. In some situations, however, the service that the user wishes to authenticate/authorize may not support the particular application. For example, a given social media site may not support multi-factor authentication or may not support the particular application. In some embodiments, the user may download a browser extension or plugin which may enables the use of the application for the social media site (e.g., through an existing integration with a multi-factor service other than the service associated with the application), and is able to complete the authentication process using the application, even though the social media site does not support the application specifically.

Downloadable Plugin for an End User to Install Web Browser

Traditionally, multifactor authentication solutions require adoption and/or integration into relying party services to provide the necessary assurance of security. In the past, for example, for users of a social media website or platform to use multifactor authentication for login, the social media site would need to support said multifactor authentication platform. In some embodiments, a plugin or other program code is usable to interface with disclosed application(s) to enable automated multi-factor authentication. This may allow automated multi-factor authentication for one or more of a website, web service, network, or service, regardless of whether entities associated with those resources provide multi-factor authentication or automated multi-factor authentication in particular.

In one embodiment, a user or manufacturer of mobile device 208 may install a plugin (e.g., by downloading the plugin) in a web browser. The plugin may be configured to enable a common service (such as the Google Authenticator service, or some other service associated with access to a web resource) By doing so, this plugin enables the now rely on a call to an automated multi-factor authentication application running on the mobile device, which may provide various functionality discussed herein. When the user responds to permission requests manually or automatically using the multi-factor authentication application, the plugin may return a token to the Google Authenticator service (or any appropriate service). These embodiments may provide a non-open source enhancement to a third party authentication service.

Contextual Information in Onboarding Process

While the embodiments discussed above have been primarily focused on the authentication and authorization of actions subsequent to creating an account, similar techniques may be applied to the use of application of contextual information from a mobile device to automate and/or enhance the onboarding process of users, e.g., when creating new accounts for users.

In some embodiments, drawing upon contextual information available on at least one mobile device may meaningfully add to a system's ability to prevent fraudulent activity. For example, this contextual information may be used to verify that account information entered by a user is accurate. As one particular example, location information stored by the mobile device may be used to verify residence or work addresses of a user before allowing the user to proceed with creating an account.

In some embodiments, the disclosed automated multi-factor authentication application is integrated into a web service, such as the web service of a bank. In this example, the onboarding process of an online user may involve establishing credentials from a known account. In some embodiments, to enroll in the bank's mobile banking application, the contextual information available to the mobile device is compared with the known details of the accountholder. For example, the location awareness of the mobile device may be used to confirm that the request is coming from the US, or from the accountholder's home state, as opposed to some other state or country. If the contextual information confirms assumptions about the onboarding process, the mobile device may send a confirmation response automatically, such that the process is invisible to the user. If the contextual information is incongruent with known account parameters, however, then the mobile device may notify the bank, prompt the user, discontinue the enrollment process, etc. in order to prevent fraud.

The disclosed techniques may be used in various onboarding processes, such as for virtual private networking (VPN) systems, identity and access management (IAM) systems, remote desktop connection (RDC) systems, enterprise resource planning (ERP) systems, payment systems (e.g., credit/debit cards, mobile wallets, ATMs), physical access, vehicle ownership, etc.

Integration into an IAM Platform

In some embodiments, administrators of an IAM system may restrict and/or allow specific privileges based on the contextual information on mobile device 208. This may allow those actions to have a higher degree of assurance and may implicitly improve the integrity and security of the system.

In one embodiment, a third party service integrates the disclosed contextual information gathering techniques into an IAM platform. In some embodiments, a specific administrator configures the system to allow any employee to access their account from any location, but certain portions of the account (e.g., an ERP platform) are only accessible when users are in their home city. Similarly, changes to accounts or access to sensitive information may be allowed only when the contextual information available on the mobile device confirms that the employee is onsite. Similar techniques may be used with various types of contextual information such as biometrics, kinetics, etc.

Enabling Channels with Contextual Information

In some embodiments, contextual information from mobile device 208 is used to determine whether to enable a channel for mobile device 208 or another computing device. For example, an administrator may restrict and/or allow specific channels based on the contextual information on a mobile device of a registered user. For example, an administrator may allow use of an SMS channel when employees are not on-site but disable the channel when employees are on-site.

Using Contextual Information in Batching Actions

In some embodiments, contextual information from mobile device 208 is used to determine whether/when to perform batch transactions (in some cases, automatically). In one embodiment, a user may initiate multiple transactions. In some embodiments, a web service may separate the transactions into different categories (e.g., based on risk, with low risk transactions in one category and high risk transactions in another category. Based on contextual information, the system may send a request to mobile device 208 to authorize performance of the batches of transactions. Based on contextual information, mobile device 208 may automatically respond to authorize performance of the transactions. For example, the mobile device 208 may automatically respond for both low risk transactions and high risk transactions when the user is at home or at work. In this example, the mobile device 208 may not automatically respond (e.g., may prompt the user for confirmation) to high risk transactions when the user is at other locations. In some embodiments, the system may wait until a qualifying event occurs (e.g., based on a change in contextual information) to perform certain categories of transactions.

Terminal Identification Based on Hardware Protocol

In various embodiments, the authentication process relies on several variables to complete a success authentication and/or authorization, including identity of user, the action being authorized, the service or relying party making the request, and the identity of the terminal from which the request emanated. Identification of the terminal may be performed in a number of ways, including the use of a hardware recognition protocol, including, but not limited to internet protocol telephony (IPT) or trusted platform module (TPM).

Traditional technology does not explicitly consider hardware recognition of the terminal of the emanating request. By so doing, systems according to some embodiments may enhance the level of assurance and integrity offered through its authentication and/or authorization process.

In one embodiment, a user attempts to login to a website. In so doing, an authentication request is issued by the relying party (website). This authentication request includes the identity of the user, the action of the user (login), the identity of the web service (website), and the identity of the terminal requesting the action. The identity of the terminal requesting the action is articulated using a hardware recognition protocol, in some embodiments, not a software-based form of device recognition. By defining the identity of the terminal based on a specific hardware protocol (e.g., unique chip-set), the relying party and the end user have greater degrees of assurance the request is authentic, enhancing the level of security.

Identification of a Mobile Device at the Hardware Level

Traditional technology does not explicitly consider unique hardware identification to sign authentication and/or authorization requests. In some embodiments, the mobile device 208 may provide detailed hardware information prior to or along with its automated responses, which may enhance the level of assurance and integrity offered through its authentication and/or authorization process.

In one embodiment, a user attempts to login to a website. In response, an authentication request is issued by the relying party (website) and is routed to the appropriate mobile device. Before displaying the authentication and/or authorization request to the end user, the identity of the mobile device is checked at the hardware level to ensure the correct pairing. For example, the mobile device and/or the authentication system may compare expected hardware identification information with actual hardware identification information for hardware present in the mobile device. If the pairing is confirmed at the hardware level, the user is presented with the request, and if appropriate, the end user approves the authentication request. The pairing may be similarly confirmed prior to accepting automated permission responses from the mobile device. In some embodiments, authentication service 206 then signs the authentication request with a unique identifier (known only to the relying party) to attest to the validity of the authentication response from said mobile device based on the hardware of the mobile device.

Various hardware aspects of mobile device 208 may be considered, such as its processor(s), manufacturer(s), memory, other components, etc. In various embodiments, any of various component identification information may be combined to generate a hardware identifier for the mobile device 208. In some embodiments, if the hardware of the mobile device changes (e.g., by replacing a damaged component with a new component), the paring of the mobile device with the authenticating service may need to be re-performed before the mobile device is allowed to respond to permission requests. In some embodiments, the disclosed hardware recognition techniques may avoid a situation where a user's subscriber identify module (SIM) card is stolen and transferred to a new device. In that situation, the new device may need to be re-paired with the service before being used, which a fraudster will typically not be able to perform.

Optical Contextual Information

In some embodiments, an optical device such as a camera is used to capture contextual information to aid in the automated permission response process. In some embodiments, the camera (e.g., in a wearable device or a smartphone) is configured to capture information that is then used to determine whether the camera/device is located at an appropriate location or in the presence of an appropriate object or individual.

In one embodiment, this approach may be demonstrated through the use of a wearable mobile device, such as smart glasses, for example. Mobile device 206 (which may be the smart glasses or a smartphone in communication with the glasses) may determine whether the smart glasses are looking at device (e.g., a computer terminal) through which the user wishes to login. The permission request from the terminal may include information indicating the visual format of the login screen. This may include a generated identifier such as a bar code, unique number, or QR code for the login screen, in some embodiments. In other embodiments, the visual format may refer to the font, spacing, color, etc. of the login screen. The mobile device may determine whether the smart glasses are viewing a screen that has the visual format of the login screen and automatically respond based on whether this is the case. In some embodiments, similar techniques may be used to confirm whether the user is actually an authorized user (e.g., based on facial recognition), whether the user is near objects in a known location (e.g., based on objects in the user's home), etc.

Figure 9:
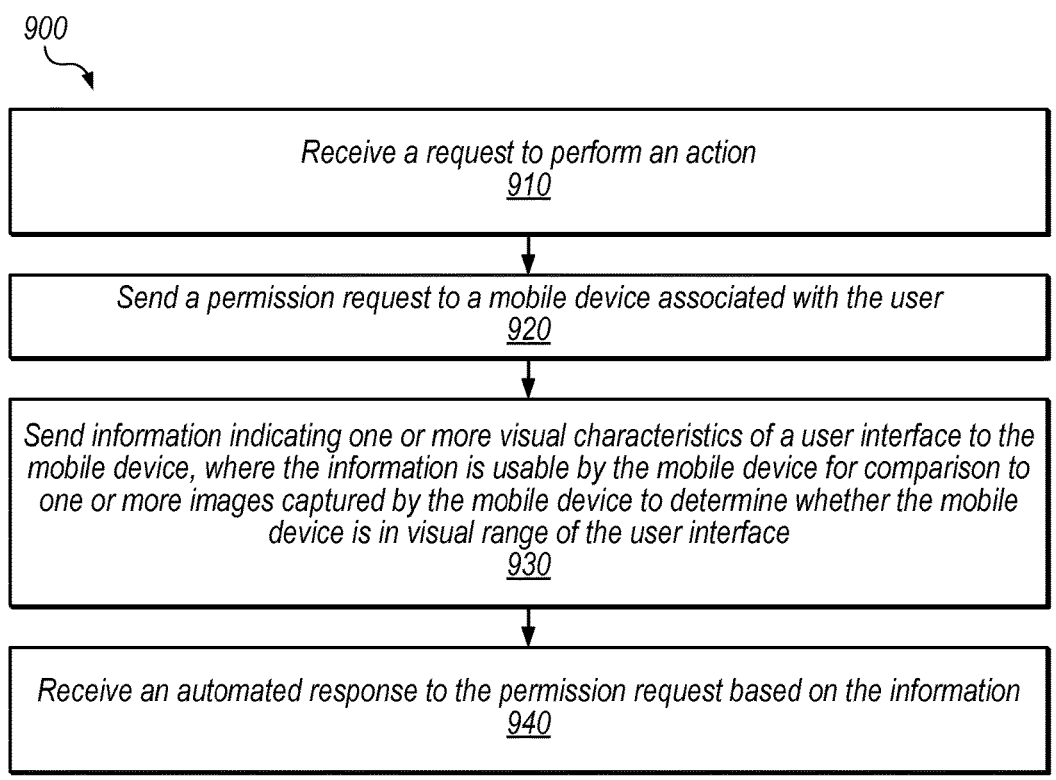
FIG. 9 is a flow diagram illustrating a method for using automated permission responses based on optical contextual information, according to some embodiments.

FIG. 9 is a flow diagram illustrating a method for using automated permission responses based on optical contextual information, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 910.

At 910, a computing system (e.g., authentication system 206) receives a request to perform an action, wherein the request is input by a user via a user interface.

At 920, the computing system sends a permission request to a mobile device associated with the user.

At 930, the computing system sends information indicating one or more visual characteristics of the user interface to the mobile device. In the illustrated embodiment, the information is usable by the mobile device for comparison to one or more images captured by the mobile device to determine whether the mobile device is in visual range of the user interface. The information may be transmitted with the permission request or separately, in various embodiments.

At 940, the computing system receives an automated response to the permission request based on the information. For example, mobile device 208 may use the information to determine whether the mobile device is in visual range of the user interface and automatically respond to the permission request (without prompting the user for input) based on the determination.

The illustrated techniques may utilize optical information to avoid user irritation and streamline multi-factor authentication, in various embodiments.

Serial Multi-Factor Contextual Information

In some embodiments, an authentication process comprises using a daisy chain of contextual items to validate an authentication and/or authorization process. This daisy chaining of contextual items is linear in build such that each preceding item depends upon each following item and as such each is a limiting factor for those preceding it.

In one embodiment, a user enters credentials into a web service, and such web service makes an API call to the authentication service which pushes a request to a paired mobile device. The device checks, for example, the location-awareness of the device as well as the fact that the mobile device is in a certain proximity of a wearable device and in turn the device is on a specific WIFI network. The context of the network connectivity of the mobile device as well as the proximity of the wearable to the mobile device and the location of the mobile device enables the automated response to the multifactor authentication/authorization request. In these embodiments, each piece of contextual information may be checked in a binary daisy-chain fashion. In some embodiments, if one of the pieces of information is not acceptable, then the authentication fails (or an automatic authentication may proceed to require manual interaction).

Non-Serial Multifactor Contextual Authentication

In other embodiments, contextual information may be examined using a daisy "sphere" rather than a chain to validate an authentication and/or authorization process. This process is non-linear in build such that each preceding item depends upon some interplay of the items in the sphere and as such each is not limiting factor for those preceding it. For example, each piece of contextual information may be given a weighting factor, in some embodiments and considered in parallel rather than sequentially. In this example, an action may be authorized based on a sum of the weighting factors assigned to the authorization criteria that are met meeting a particular threshold value. For example, location may be assigned a weight of 2, hardware ID a weight of 1, and connectivity to another device a weight of 1. In this example, a particular action may have a threshold of 2 such that if the location criterion and at least one other criterion are met, then the action is authorized.

In one embodiment, a user enters credentials into a web service, and the web service then makes a call to authentication service 206, which in turn contacts mobile device 208. The device checks the location of the device as well as the fact that the mobile device is within a certain proximity to a wearable and in turn the wearable is on a specific WIFI network. In this example, some combination of the context of the network connectivity of the wearable as well as the proximity of the wearable to the mobile device and the location of the mobile device may enable the automated response to the multifactor authentication/authorization request, even if one of the pieces of contextual information does not match (e.g., the device is not currently connected to the specific WIFI network, but its location is correct and it is within a specified proximity to the wearable). In some embodiments, users or administrators may assign various combinations of acceptable automation criterion based on contextual information.

Use of an Oblivobox

An oblivobox may be constructed to pass sensitive information through a third party, without the third party having access to what is inside of the container. The oblivobox is a novel approach to design a system and/or process of pre-existing methodologies to accomplish a specific goal of passing secrets through intermediaries.

In one embodiment, a user enters credentials into a web service, and such web service and/or browser extension makes an API call to the authentication service 206 which pushes a request to a paired mobile device. The device then passes a secret back to the API to populate a specific one-time password (OTP) field in the browser. This automated process does not share sensitive information with the API or mobile device, but yet triggers and passes an uncompromised secret from the mobile device, through the API, into the field.

Exemplary Method for Automating Permission Responses

Figure 10:
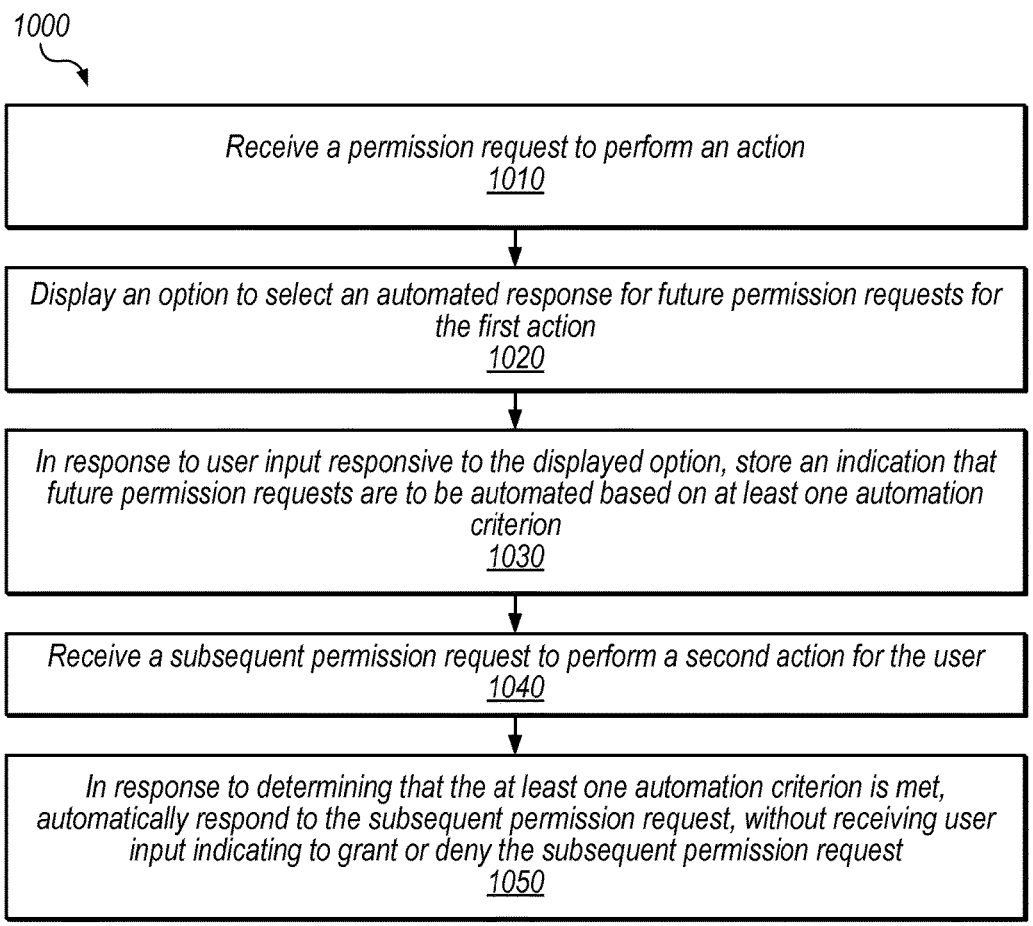
FIG. 10 is a flow diagram illustrating a method for generating automated permission responses based on optical contextual information, according to some embodiments This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIG. 10 is a flow diagram illustrating a method for generating automated permission responses based on optical contextual information, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 1010.

At 1010, a mobile device receives a permission request to perform a first action. The request may be the Nth factor in a multi-factor authentication process.

At 1020, the mobile device displays an option to select an automated response for future permission requests. For example, the mobile device may display one or more automation criteria, display information indicating the action, allow the user to select a set of one or more automation criteria to automate future requests, display information indicating an account associated with the action, display information indicating a terminal associated with the request, etc.

At 1030, the mobile device stores, in response to user input responsive to the displayed option, an indication that future permission requests are to be automated based on at least one automation criterion. As discussed above, the user input may configure various automation parameters.

At 1040, the mobile device receives a subsequent permission request to perform a section action for the user. The action may be the same action or a different type of action (e.g., both actions may be logins or one action may be a login and the other action a transfer). If the action is a different type of action, it may be an action in a set of actions for which the user input specified an automated response.

At 1050, the mobile device, in response to determining that the at least one automation criterion is met, automatically responds to the subsequent permission request, without receiving user input indicating to grant or deny the subsequent permission request.

Various actions requiring authentication/authorization have been described herein. It is understood that these actions are merely exemplary and that the methods, devices, and systems according to some embodiments may be used to authenticate/authorize many different kinds of actions.

Embodiments of the subject matter described in this specification may be implemented in a computing system that includes a back end component, e.g., a data server, or that includes a middleware component, e.g., an application server, or that includes a front end component, e.g., a client computer having a graphical user interface or a web browser through which a user may interact with an implementation of the subject matter described is this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Furthermore, the flow charts depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having computer instructions stored thereon that are capable of causing a mobile device to perform operations comprising:
   receiving a first permission request from an authorization system as a factor in a first multi-factor authentication process initiated by another device, wherein the first permission request is a request for authorization from the mobile device to perform an action, and wherein the first permission request specifies a first set of one or more automation criteria to be considered by the mobile device in determining whether to respond to the first permission request without prompting a user for input;
   determining to automatically grant or deny the first permission request without prompting a user for input based on determining that the first set of one or more automation criteria specified in the first permission request are met;
   receiving a second permission request from the authorization system as a factor in a second multi-factor authentication process initiated by another device, wherein the second permission request is a request for authorization to perform an action, and wherein the second permission request specifies a second set of one or more automation criteria to be considered by the mobile device in determining whether to respond to the second permission request without prompting a user for input; and
   determining to prompt the user for input specifying whether to grant or deny the second permission request based on determining that the second set of one or more automation criteria specified in the second permission request are not met.

2. The non-transitory computer-readable medium of claim 1, wherein the first set of one or more automation criteria includes a criterion corresponding to a location of the mobile device.

3. The non-transitory computer-readable medium of claim 2, wherein the criterion corresponding to the location of the mobile device indicates to automatically respond to permission requests that are received when the mobile device is in a particular geographic region.

4. The non-transitory computer-readable medium of claim 1, wherein the operations further comprise:
   receiving information specifying user selection of one or more automation criteria for future permission requests; and
   storing the information;
   wherein at least one of the first set of one or more automation criteria is based on the stored information.

5. The non-transitory computer-readable medium of claim 1, wherein the first set of one or more automation criteria includes at least one criterion that corresponds to: location, acceleration, velocity, wireless connectivity, proximity to another device, temperature, lighting, noise, time, biometrics, altitude, pressure, or image characteristics.

6. The non-transitory computer-readable medium of claim 1, wherein the first permission request is initiated external to the mobile device.

7. A mobile device, comprising:
   at least one antenna;
   one or more processing elements coupled to the at least one antenna;
   one or more memories having program instructions stored thereon that are capable of causing the mobile device to:
   receive a first permission request from an authorization system as a factor in a first multi-factor authentication process initiated by another device, wherein the first permission request is a request for authorization from the mobile device to perform an action, and wherein the first permission request specifies a first set of one or more automation criteria to be considered by the mobile device in determining whether to respond to the first permission request without prompting a user for input;
   determine to automatically grant or deny the first permission request without prompting a user for input based on determining that the first set of one or more automation criteria specified in the first permission request are met;
   receive a second permission request from the authorization system as a factor in a second multi-factor authentication process initiated by another device, wherein the second permission request is a request for authorization to perform an action, and wherein the second permission request specifies a second set of one or more automation criteria to be considered by the mobile device in determining whether to respond to the second permission request without prompting a user for input; and
   determine to prompt the user for input specifying whether to grant or deny the second permission request based on determining that the second set of one or more automation criteria specified in the second permission request are not met.

8. The mobile device of claim 7, wherein the action associated with the first permission request and the action associated with the second permission request are the same type of action.

9. The mobile device of claim 7, wherein the first and second sets of one or more automation criteria each include a criterion corresponding to a location of the mobile device.

10. The mobile device of claim 9, wherein the criterion corresponding to the location of the mobile device indicates automatically responding to permission requests that are received when the mobile device is in a particular geographic region.

11. The mobile device of claim 7, wherein the first and second sets of automation criteria are the same.

12. The mobile device of claim 7, wherein the first set of one or more automation criteria includes two or more criteria that correspond to two or more of: location, acceleration, velocity, wireless connectivity, proximity to another device, temperature, lighting, noise, time, biometrics, altitude, pressure, or image characteristics.

13. The mobile device of claim 7, wherein the action associated with the first permission request is a login.

14. A method, comprising:
   receiving, by a computing system, information indicating a request by a user to perform an action;
   determining, by the computing system, a set of one or more automation criteria under which a mobile device associated with the user should respond to a permission request for authorization from the mobile device to perform the action;
   transmitting, by the computing system, a first permission request to the mobile device associated with the user as a factor in a first multi-factor authentication process initiated by another device, wherein the first permission request specifies the set of one or more automation criteria to be considered by the mobile device in determining whether to respond to the first permission request without prompting a user for input;
   receiving, by the computing system, a response granting or denying the first permission request, wherein the response is automatically generated by the mobile device based on the set of one or more automation criteria without prompting the user for input to accept or deny the first permission request;
   receiving, by a computing system, information indicating a second request by a user to perform an action;
   determining, by the computing system, a second set of one or more automation criteria under which a mobile device associated with the user should respond to a second permission request for authorization from the mobile device to perform the action;
   transmitting, by the computing system, a second permission request to the mobile device associated with the user as a factor in a second multi-factor authentication process initiated by another device, wherein the second permission request specifies the second set of one or more automation criteria to be considered by the mobile device in determining whether to respond to the second permission request without prompting a user for input; and
   receiving, by the computing system, a response from the mobile device granting or denying the second permission request based on input received from the user at the mobile device in response to a prompt.

15. The method of claim 14, wherein the action associated with the first permission request and the action associated with the second permission request are the same type of action.

16. The method of claim 14, wherein the determining the set of one or more automation criteria is based on past input from the user.

17. The method of claim 14, wherein the set of one or more automation criteria includes a criterion that the mobile device is within a particular geographic region.

18. The method of claim 14, wherein the set of one or more automation criteria includes a criterion that the mobile device is in communication with another computing device via a short-range wireless connection.

19. The method of claim 14, wherein the set of one or more automation criteria includes a criterion that an image captured by the mobile device includes one or more visual characteristics associated with a user interface via which the user initiated the request.

\* \* \* \* \*